Feb. 15, 1966 W. KOBER 3,235,760
DYNAMO FIELD STRUCTURE
Filed Dec. 28, 1961 2 Sheets-Sheet 2
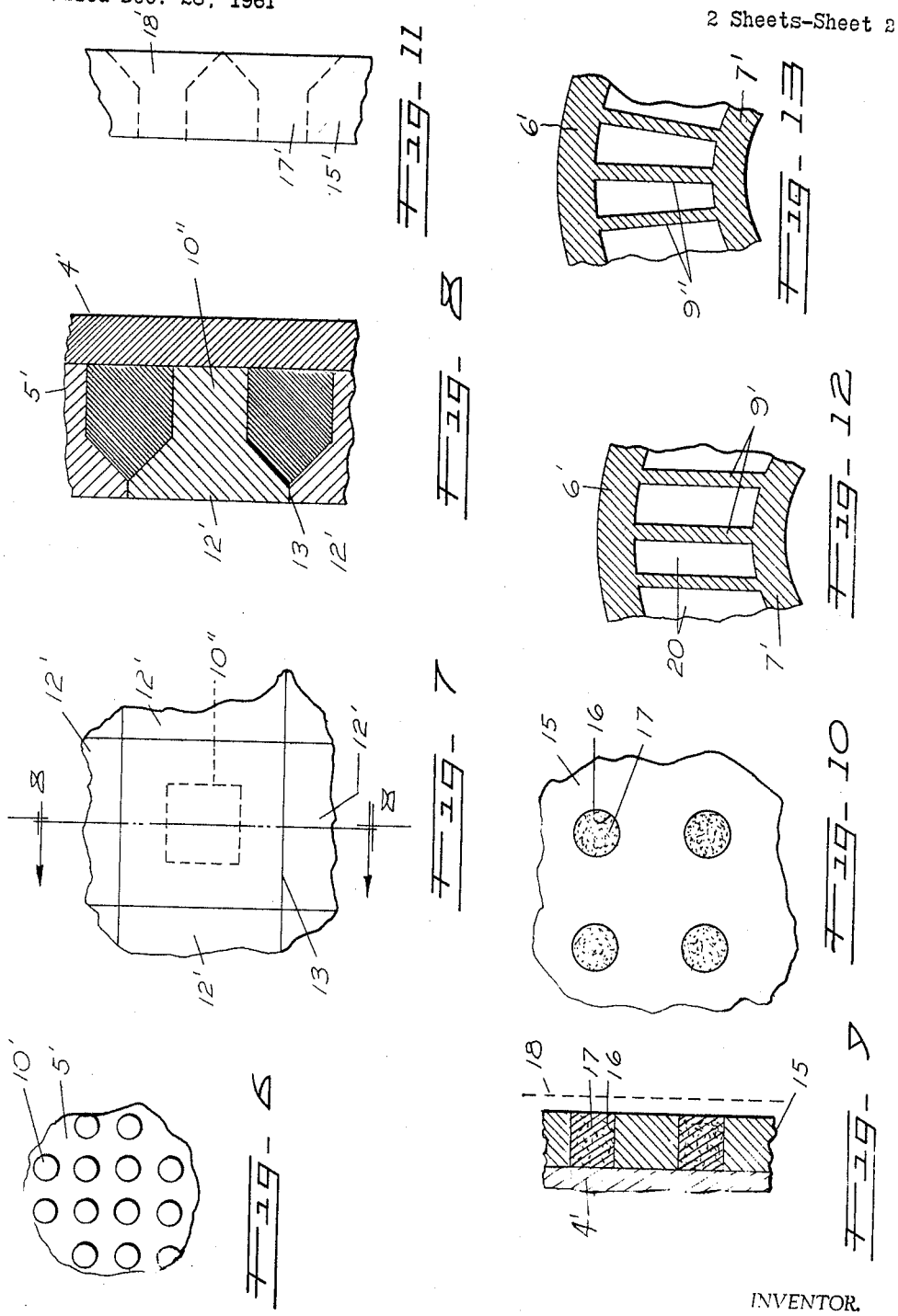
INVENTOR.
WILLIAM KOBER
BY
Christel & Bean
ATTORNEYS United States Patent Office 3,235,760
Patented Feb. 15, 1966

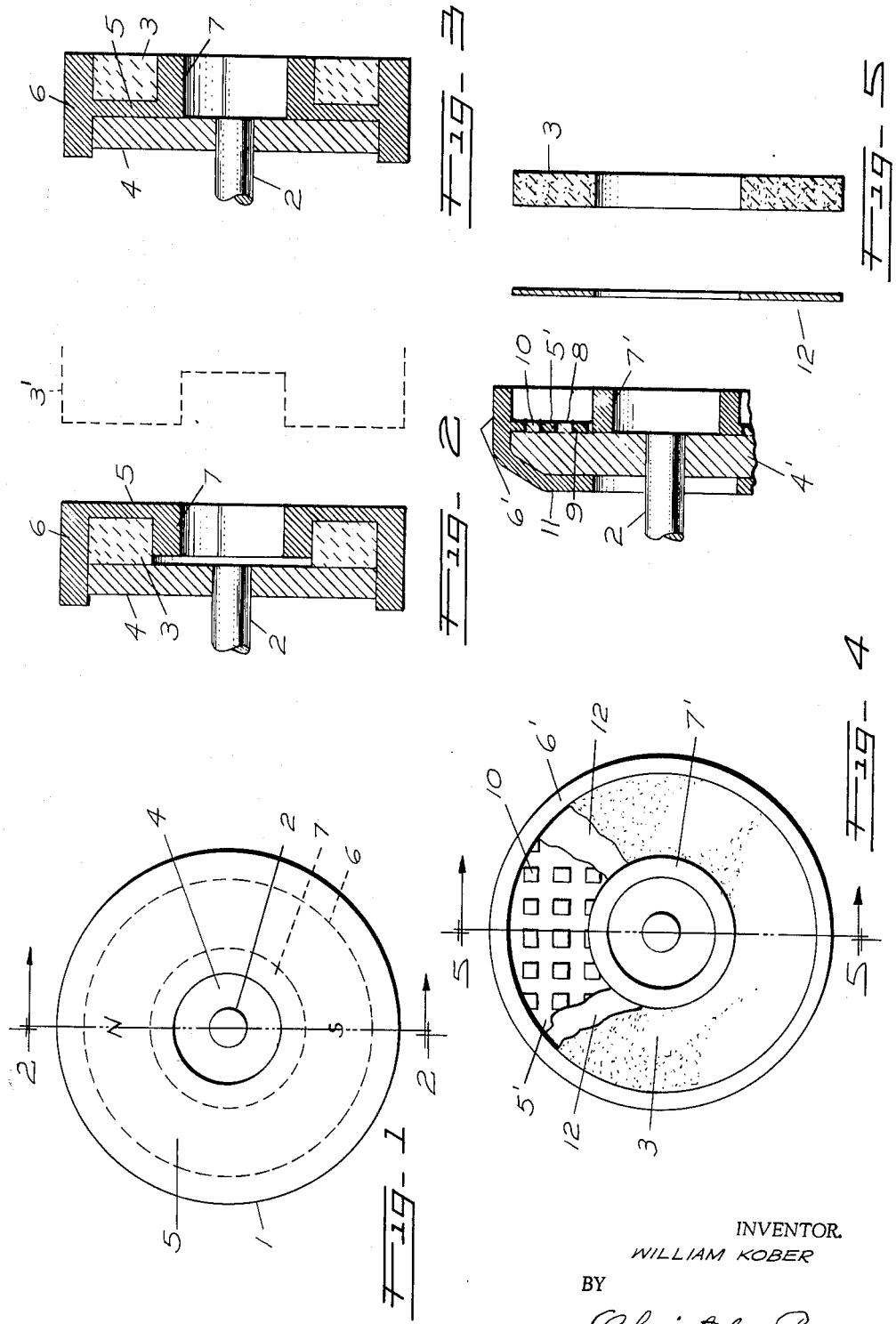

3,235,760
DYNAMO FIELD STRUCTURE
William Kober, Fairport, N.Y., assignor, by mesne assignments, to The Garrett Corporation, Los Angeles, Calif., a corporation of California
Filed Dec. 28, 1961, Ser. No. 162,643
17 Claims. (Cl. 310—156)

This invention relates generally to the dynamoelectric art, and more specifically to a new and useful damping and magnet protecting arrangement for dynamo field producing structures.

When an alternating current generator is loaded single phase, pole face damping increases its capacity and reduces heating produced in the pole faces by armature load currents. A decrease in resistance of the damper paths is accompanied by an increase in the effectiveness of the damper winding, and the resistance should be at least as low as the one turn equivalent resistance of the armature.

In addition to damping, a permanent magnet generator requires protection of the magnet material from the demagnetizing effects of armature reaction, which is at its worst under short circuit conditions. A permanent magnet can be protected against the transient short circuit demagnetizing effect by encircling the magnet and its flux with an electrically conductive path. The protecting effect is proportional to the electrical conductivity of the path, and has no theoretical limit. The steady state short circuit demagnetizing effect cannot be opposed by current carrying paths, of either the encircling type or the pole face damper type, in a polyphase loading. However, if the loading is only single phase, a heavy damper can reduce the peak demagnetizing force to one-half its magnitude without such damping, which is an important gain.

Therefore, it is desired to provide both types of electrically conductive paths in a permanent magnet machine.

Pole face damping and the magnet encircling type of protection are quite different in theory, and normally also are quite different in application. Indeed, when the permanent magnet field has magnetic pole faces, the damper can closely resemble that which is used in conventional electromagnet field machines. However, when the permanent magnet material is of low permeability, such as the ceramic materials now coming into use, and has no added pole pieces, production of the required electrical conductivity in the damping circuit is a problem. One solution, disclosed in my pending application Serial No. 838,949, now Patent Number 3,121,814, uses a conducting metal sheet overlying the air gap face of the magnet material, facing the armature. This method is effective, and continuation of the sheet axially around the sides of the magnet body will provide an encircling electrically conductive path. However, such an arrangement requires increased spacing between the magnet and the armature, to accommodate the thickness of the metal sheet, and this results in reduced performance.

The primary object of this invention is to produce the desired damping effect, and in conjunction therewith the desired encircling effect, requiring no increase in the reluctance of the magnetic path to accommodate the damping material.

A dynamo field producing structure of this invention is characterized, in one aspect thereof, by the provision of a flux return member of magnetic material facing one end of a permanent magnet body, the face of the flux return member adjacent the magnet body comprising a grid of magnetic material, and a damper grid of electrically conductive material intermeshed with the magnetic grid thereby to provide the requisite damping action without adding the damper thickness to the magnetic circuit.

In another aspect thereof, a dynamo field producing structure of this invention is characterized by the provision of a flux return member having a grid of magnetic material facing an end of a permanent magnet body, with a damper grid of electrically conductive material intermeshing with the magnetic grid, as above, and with a flux collecting and distributing member interposed between the magnet and the flux return member, the collecting and distributing member substantially covering the intermeshing grids for collecting flux from the magnet body and distributing it to the magnetic grid.

In still another aspect thereof, a dynamo field producing structure of this invention is characterized by the provision of a permanent magnet and a flux return member facing one end thereof, the flux return member face adjacent the magnet body comprising a grid of magnetic material, a matching grid of electrically conductive material intermeshing with the magnetic grid, and additional electronically conductive material encircling the magnet body and electrically joined to the electrically conductive grid, whereby the electrically conductive material functions both as a damper winding and as a short circuited winding encircling the magnet body to protect the magnetic state thereof.

The foregoing and other objects, advantages and characterizing features of a permanent magnet encircling and damping arrangement of this invention will become clearly apparent from the ensuing detailed description of certain illustrative embodiments thereof, taken in conjunction with the accompanying drawings wherein like reference numerals denote like parts throughout the various views and wherein:

FIG. 1 is an end elevational view of a rotating permanent magnet field structure having a damping and encircling arrangement of the type disclosed in my pending application Ser. No. 838,949, now Patent Number 3,121,814;

FIG. 2 is a sectional view thereof, taken about on line 2—2 of FIG. 1 and shown in conjunction with an armature indicated in phantom;

FIG. 3 is a view similar to FIG. 2, but showing a modification;

FIG. 4 is an end elevational view of a permanent magnet field structure incorporating a damping and encircling arrangement of this invention, certain parts being broken away to show details;

FIG. 5 is an exploded sectional view thereof, taken about on line 5—5 of FIG. 4;

FIG. 6 is a fragmentary end elevational view of a modified conducting grid arrangement;

FIG. 7 is a fragmentary end elevational view, on an enlarged scale, of still another conducting grid arrangement;

FIG. 8 is a sectional view thereof taken about on line 8—8 of FIG. 7;

FIG. 9 is a view similar to FIG. 8, but on a reduced scale and showing a modification;

FIG. 10 is an end elevational view thereof;

FIG. 11 is a view like FIG. 9, but showing still another modification; and

FIGS. 12 and 13 are fragmentary end elevational views showing still other modifications.

Referring now in detail to the accompanying drawings, FIGS. 1 and 2 show a permanent magnet, rotating field structure 1 carried by a shaft 2 and arranged to face an armature, generally indicated at 3', across an air gap in an axial air gap construction.

The field structure 1, like that disclosed in my earlier application referred to above, comprises an annular magnet body 3 of ceramic material, mounted on a flux return member 4 in the form of a ferromagnetic plate or disc providing a flux return circuit. Member 4 mounts the field structure on shaft 2.

The protecting-damper elements comprise a structure including a face portion 5 overlying the air gap end face of magnet 3 and joined to side portions 6 and 7, the portion 6 serving to mount the magnet and its protecting structure on flux return member 4 while face portion 5 protects the magnet face against spalling and other mechanical damage.

The protective portions 5, 6 and 7 are made of a highly electrically conductive material, such as copper or aluminum, and can be either one piece or several pieces joined both mechanically and electrically. If we assume the magnet body 3 to comprise a 2-pole magnet, having a north and a south as indicated therein, then it will be seen that electrically conductive paths encircle each of the magnet areas. These paths extend across face portion 5 to the ring provided by the outer side portion 6, back across face 5 to the inner collection ring portion 7, and back to face 5 to complete a short circuited turn. The ring portions 6 and 7 are thicker than the face portion 5, which must be kept relatively very thin because it requires increased separation between magnet 3 and armature 3', and thereby reduce the electrical resistance of the overall path.

It is seen that the entire face area 5 is active in conjunction with these protective conducting paths, which latter encircle the active areas of the magnet body which can be pole areas or areas opposed to armature reaction flux.

A similar arrangement is shown in FIG. 3, except that the face portion 5 now is positioned against the back face of magnet body 3. If the pole width of magnet 3 is of the order of thickness of the magnet, or larger, then the electrically conductive path now completed across the rear face 5 will produce substantially the same result as with the embodiment of FIGS. 1 and 2. With a 2-pole machine, for example, the difference in result is very small.

Thus, it is shown that the electrically conductive face portion 5 can be positioned on the rear face of the magnet body. However, the increased thickness caused by face portion 5 remains in the magnet circuit. It has simply been moved from one part of the circuit to another. Therefore, the embodiment of FIG. 3 offers no particular advantage over the embodiment of FIG. 2, from this point of view.

This objection is avoided, and the problem solved, by my invention, a presently preferred form of which is shown in FIG. 4. Here, the flux return member 4' has its face 8, facing the rear face of magnet body 3, cut by a series of grooves 9, comprising two sets of generally parallel grooves. The two sets of grooves 9 are right angularly related to each other, whereby the face 8 of member 1' is formed with a magnetic grid comprising a series of square bosses 10.

Then, grooves 9 are filled, as by casting, with a highly electrically conductive metal such as aluminum or copper, to provide an electrically conductive grid 5', corresponding to face portion 5 of FIGS. 1–3 but meshing with the magnetic grid defined by bosses 10. The same casting can produce the inner and outer, electrically conductive rings 6', 7' which are thereby electrically and mechanically joined to the grid 5'. The structure 5', 6', 7' provides the damping and magnet encircling protective function previously described.

Electric current can flow in the cast grid 5', around the bosses 10, and it will be appreciated that the electrical conductivity of grid 5' is about the same at any angle. The grid 5' therefore is the equivalent of the grid 5 for the intended purpose. At the same time, the thickness of grid 5' is merged into and combined with that of the flux return member 4', and specifically the magnetic grid 10, whereby it is completely removed from the magnetic circuit. In other words, face portion 5 is removed and eliminated, as far as its mechanical thickness is concerned, but its function is retained.

The flux conducting bosses 10 are of sufficient collective area to handle the flux produced by magnet 3. This is because ceramic magnet materials, such as barium ferrite, have a relatively low working flux density as contrasted with Alnico. For example, the ceramic material will have a density approximately ¼ that of conventional steel magnets, with little loss of M.M.F., and therefore the total area of bosses 10 can be approximately ¼ the face area of flux return member 4'. This makes the width of bosses 10, and of the horizontal and vertical grooves 9, approximately equal. The resulting conductivity is that of a solid sheet, about ¾ the thickness of the groove depth, which can be any amount desired since the bosses offer negligible resistance to the flow of flux.

When casting grid 5' and rings 6' and 7' integral therewith, an extension 11 of ring 6', over the rear face of flux return member 4', also can be cast. The electrical flow path then is shorter, because instead of going around ring 6 current will go chordwise across the back of member 4' through the rearward extension 11. This shorter path results in improved conductivity which is particularly advantageous with a relatively low number of poles. The material of extension 11 will supplement the conductivity of ring 6', and keep down its diameter, for any number of poles.

Magnet body 3 could be placed directly against the bosses 12, but some loss in M.M.F. would result because the flux must concentrate to bosses 10 in the low permeability magnet material. The loss caused by such concentrating can be reduced to a minimum, by making grid structure 10 as fine as possible. However, this problem is substantially eliminated, in accordance with my invention, by providing a collector and distributor member 12 which can take the form of a thin annular sheet 12 of ferromagnetic material placed between meshed grids 5' and 10, and the back face of magnet 3.

Member 12 collects flux from the magnet 3, and distributes it to the bosses 10, and the necessary thickness of member 12 required for this function is so small that its presence has no material effect on the magnetic operation of the structure. Ring 12 has substantially the same inner and outer diameter as the magnet body.

Thus, the electrically conductive grid 5' conducts at all angles, while plate 12 collects and distributes flux to the bosses 10 and thereby provides an excellent magnetic path for flux. The desired damping and protective effect is obtained with no loss in magnetic performance.

While the electrically conductive material can be cast in place, and thereby held in place by casting, the contacting surfaces of the various parts can be cemented together. Thus, plate 12 can be cemented to magnet body 3 and to the grid face of flux return member 4', and rings 6' and 7' can be cemented to the magnet body.

Grooves 9 can be of any desired cross-sectional configuration, such as rounded or V-shaped as well as rectangular. Similarly, bosses 10 need not be rectangular but could have other cross-sectional configurations, as indicated by the rounded bosses 10' in FIG. 6.

In the modification of FIGS. 7 and 8, the collector plate 12 is replaced by laterally enlarged, ferromagnetic heads 12' comprising extensions of bosses 10''. The heads 12' have flat side walls 13 which abut and taper to bosses 10'' which comprise the flux conducting magnetic grid while heads 12' comprise the flux collecting portion. Heads 12' could be hexagonal or of other configurations.

FIG. 9 shows still another arrangement in which the electrically conductive grid comprises a sheet 15 of electrically conductive material. Sheet 15 is perforated, to provide holes 16 which are filled with iron filings or dust, mixed with cement, to comprise magnetic bosses 17. They may also be cylinders of solid magnetic iron. Also, a layer of magnetic filings mixed with cement 18 can be applied over the outer surface of sheet 15, in contact with bosses 17, to function as the collector and distributer member.

The electrically conductive plate 15' can be provided with tapered holes as shown in FIG. 11, which are filled with magnetic filings and cement to provide the flux conducting bosses 17' and having heads 18' similar to heads 12' of FIG. 8. Heads 18' function as the flux collecting and distributing member.

Where electrical conductivity is required along only one direction, one set of parallel grooves 9' can be provided, leaving a grid of flux conducting magnetic bosses 20 therebetween, as shown in FIG. 12. These grooves are filled with a grid of electrically conductive material, as in any of the earlier embodiments.

The grid defining grooves can be radial, as shown at 9" in FIG. 13, but the divergence of the grooves means that not as much conducting material per unit surface area is available. However, if the magnet body is relatively thin, with only a moderate difference in diameter between inner and outer rings 6 and 7, this method is useable.

Accordingly, it is seen that my invention fully accomplishes its intended objects. There are provided the desired pole face and magnet encircling, current conducting paths, in an arrangement which avoids introducing additional thickness and resulting separation in the magnetic circuit. While I have disclosed in detail only certain presently contemplated embodiments of my invention, that is done by way of illustration only and without thought of illustration.

Having fully disclosed and completely described my invention, and its mode of operation, what I claim as new is:

1. In a dynamo having an armature, a field producing structure facing said armature across an air gap and comprising a body of permanent magnet material having an air gap end face and an opposite end face remote from said air gap, a flux return member of magnetic material facing said opposite end face of said magnet body, the face of said flux return member adjacent said opposite magnet body end face comprising a grid of magnetic material, a matching grid of electrically conductive material intermeshing with said magnetic grid, and additional electrically conductive material encircling said magnet body and electrically joined to said electrically conductive grid, whereby said electrically conductive material functions both as a damper winding and as a short circuited winding around the magnet body to protect the magnetic state thereof, and whereby said matching grid of electrically conductive material is separated from said armature by said permanent magnet body and works through said permanent magnet body.

2. The dynamo field producing structure of claim 1, wherein said magnetic grid comprises multiple bosses spaced apart by angularly related sets of grooves, and said electrically conductive grid comprises a mesh occupying said grooves.

3. The dynamo field producing structure of claim 1, wherein said magnetic grid comprises multiple bosses spaced apart by generally parallel grooves extending across said flux return member in one direction only, and said electrically conductive grid is received in said grooves.

4. The dynamo field producing structure of claim 1, wherein said magnetic grid comprises multiple bosses spaced apart by outwardly diverging grooves extending across said flux return member, and said electrically conductive grid is received in said grooves.

5. The dynamo field producing structure of claim 1, wherein said magnetic grid is formed integrally with said flux return member, and said electrically conductive grid is cast in place thereon.

6. The dynamo field producing structure of claim 5, wherein said additional electrically conductive material is cast integrally with said electrically conductive grid.

7. The dynamo field producing structure of claim 6, wherein said electrically conductive material extends across the face of said flux return member which is remote from said magnet body.

8. The dynamo field producing structure of claim 1, wherein said electrically conductive grid comprises a perforated matrix, and said magnetic grid comprises magnetic particles cemented in the perforations of said matrix.

9. In a dynamo field producing structure, a body of permanent magnet material, a flux return member of magnetic material facing one end face of said magnet body, the face of said flux return member adjacent said one magnet body end face comprising a grid of magnetic material, a matching grid of electrically conductive material intermeshing with said magnetic grid, additional electrically conductive material encircling said magnet body and electrically joined to said electrically conductive grid, whereby said electrically conductive material functions both as a damper winding and as a short circuited winding around said magnet body to protect the same against the demagnetizing effects of armature reaction and a flux collector interposed between said one magnet body end face and said flux return member for collecting flux from the former and distributing it to the magnetic grid of the latter.

10. A dynamo field producing structure as set forth in claim 9, wherein said flux collector comprises a thin sheet of magnetic material.

11. A dynamo field producing structure as set forth in claim 9, wherein said magnetic grid comprises multiple bosses spaced apart by grooves in which said electrically conductive grid is received, and said flux collector comprises laterally enlarged heads on said bosses extending across said grooves.

12. The dynamo field producing structure of claim 9, wherein said electrically conductive grid comprises a perforated matrix, said magnetic grid comprises magnetic particles cemented in the perforations of said matrix, and said flux collector comprises a layer of magnetic particles over said electrically conductive matrix.

13. The dynamo field producing structure of claim 9, wherein said electrically conductive grid comprises a perforated matrix, said perforations having contiguous end portions over one face thereof, and magnetic particles cemented in said perforations to comprise said magnetic grid and said flux collector.

14. In a dynamo having an armature, a field producing structure facing said armature across an air gap and comprising a body of permanent magnet material having an air gap end face and an opposite end face remote from said air gap, a flux return member of magnetic material facing the said opposite end face of said magnet body, the face of said flux return member adjacent said opposite magnet body end face comprising a grid of magnetic material, and a damper grid of electrically conductive material intermeshing with said magnetic grid, said damper grid being spaced from said armature by said permanent magnet body and working through said body.

15. The dynamo field producing structure of claim 14, together with a flux collector interposed between said magnet body and said flux return member for collecting flux from the former and distributing it to the magnetic grid of the latter.

16. In a dynamoelectric machine of the axial air gap type, a rotary field producing structure comprising, a shaft journaled for rotation about the axis thereof, an annular body of ceramic permanent magnet material generally concentric with said axis, a first annular member of magnetic material against one end face of said magnet body providing a flux return path for said body, and a second annular member of unitary construction having an outer annular side wall generally concentric with said axis encircling the outer peripheral side of said magnet body for supporting the latter against centrifugal force and an annular end wall extending inwardly along the face of said flux return member opposite said magnet body, said first annular member mounting said field structure on said shaft.

17. The combination of claim 16, wherein said second member comprises a material selected from the group consisting of aluminum and copper.

References Cited by the Examiner
UNITED STATES PATENTS

| | | | |
|---|---|---|---|
| 2,432,436 | 12/1947 | Morrill | 310—156 |
| 2,659,021 | 11/1953 | Poliansky | 310—106 |
| 2,939,023 | 5/1960 | Fehr | 310—106 |

ORIS L. RADER, *Primary Examiner.*

MILTON O. HIRSHFIELD, *Examiner.*